US012453855B2

United States Patent
Keenan

(10) Patent No.: US 12,453,855 B2
(45) Date of Patent: Oct. 28, 2025

(54) SYSTEM AND METHOD FOR PERIPHERAL NERVE STIMULATION

(71) Applicant: Desmond Barry Keenan, Las Vegas, NV (US)

(72) Inventor: Desmond Barry Keenan, Las Vegas, NV (US)

( * ) Notice: Subject to any disclaimer, the term of this patent is extended or adjusted under 35 U.S.C. 154(b) by 266 days.

(21) Appl. No.: 17/352,297

(22) Filed: Jun. 19, 2021

(65) Prior Publication Data

US 2024/0252820 A1    Aug. 1, 2024

Related U.S. Application Data

(60) Provisional application No. 63/041,623, filed on Jun. 19, 2020.

(51) Int. Cl.
*A61N 1/36* (2006.01)
*A61N 1/02* (2006.01)
(Continued)

(52) U.S. Cl.
CPC ......... *A61N 1/36031* (2017.08); *A61N 1/025* (2013.01); *A61N 1/0452* (2013.01);
(Continued)

(58) Field of Classification Search
CPC .. A61N 1/36031; A61N 1/025; A61N 1/0452; A61N 1/0456; A61N 1/0476;
(Continued)

(56) References Cited

U.S. PATENT DOCUMENTS

| 2015/0224307 A1* | 8/2015 | Bolea ................ A61N 1/36057 607/42 |
| 2018/0043159 A1* | 2/2018 | Hassan .............. A61N 1/36031 |
| 2020/0346017 A1* | 11/2020 | Caparso ............... A61B 5/7264 |

OTHER PUBLICATIONS

Douglas, N. J., White, D. P., Pickett, C. K., Weil, J. V., & Zwillich, C. W. (1982). Respiration during sleep in normal man. Thorax, 37(11), 840-844. https://doi.org/10.1136/thx.37.11.840 (Year: 1982).*

* cited by examiner

*Primary Examiner* — Benjamin J Klein
*Assistant Examiner* — Daniel Tehrani
(74) *Attorney, Agent, or Firm* — Mertzlufft Law PLLC dba Stake; Joshua Mertzlufft

(57) ABSTRACT

Obstructive sleep apnea from blockage of the upper airway can result in significant daytime drowsiness, with many long-term co-morbidities associated with this disorder such as such as hypertension. A common cause of obstructive sleep apnea is the complete concentric collapse of the soft pallet or retrusion of the genioglossus muscle into the upper airway obstructing breathing. The latter can be due to exhaustion of the muscle due to heightened activation during wake periods, or a greater number of type II muscle fibers can contribute to muscle fatigue. It could also be neurological, whereby the hypoglossal nerve which controls most the upper airway muscles fails to innervate the genioglossus sufficiently to prevent backward movement and pharyngeal block. Described herein is an intelligent personalized closed loop neuromodulation system and methods to prevent backwards movement of the genioglossus muscle through stimulation of certain branches of the hypoglossal nerve and muscle motor points, by using muscle feedback from electromyogram sensors to provide optimal stimulus. Alternative embodiments to treat neuropathic pain and urinary dysfunction are enclosed.

22 Claims, 21 Drawing Sheets

(51) Int. Cl.
*A61N 1/04* (2006.01)
*A61N 1/05* (2006.01)

(52) U.S. Cl.
CPC ......... *A61N 1/0456* (2013.01); *A61N 1/0476* (2013.01); *A61N 1/0492* (2013.01); *A61N 1/0548* (2013.01); *A61N 1/36003* (2013.01); *A61N 1/36034* (2017.08)

(58) Field of Classification Search
CPC ................ A61N 1/0492; A61N 1/0548; A61N 1/36003; A61N 1/36034; A61N 1/36014; A61N 1/3611; A61N 1/36139; A61N 1/3601; A61N 1/37211; A61B 5/4818; A61B 5/389; A61B 5/4836; A61B 5/0826; A61B 5/682; A61B 5/6833
See application file for complete search history.

Adopted from Palmieri et al. 2004

SYSTEM AND METHOD FOR PERIPHERAL NERVE STIMULATION

RELATED APPLICATIONS

This application claims priority to U.S. Provisional Application Ser. No. 63/041,623 filed Jun. 19, 2020 entitled System and Methods for Peripheral Nerve Stimulation, which is incorporated herein by reference in its entirety.

FIELD OF INVENTION

This invention relates in general to neurostimulation medical devices, and more particularly to body worn devices or implantable devices for sensing and stimulation of nerves and muscles.

BACKGROUND

Obstructive sleep apnea (OSA) is a highly prevalent disorder estimated to affect up to 1 in 4 people and has been linked to several comorbidities such as hypertension and heart disease. OSA is a result of upper airway obstruction leading to a temporary cessation of breathing and consequent arousal from sleep. Obstruction can occur due to a complete concentric collapse of the soft palate and lateral walls of the throat, or more commonly a result of the Genioglossus (GG) muscle failing to maintain its position during sleep and descending into the airway creating an obstruction. Adequate airway force is required to ensure sufficient dilation of the upper airway and maintain patency. The GG is 1 of the 4 paired extrinsic muscles of the tongue responsible for tongue movement. Four intrinsic muscles work to change tongue shape that are detached from any bone, whereas the 4 extrinsic muscles control the position of the tongue and are attached to the hyoid bone. The GG muscles are responsible for protrusion of the tongue and are a fan-shaped pair that forms most of the body of the tongue, arising from the mental spine of the mandible and adjoins the hyoid bone at the bottom of the tongue situated left and right of medial chin area. It is believed that the reduction in force leading to an OSA event is due to either a decrease in neural drive or GG muscle fatigue resulting in airway narrowing or collapse with the GG descending into the airway. This abnormal behavior of the GG in OSA sufferers is exhibited by elevated levels of activation during wake periods leading to fatigue during sleep, and sufferers often have a greater proportion of Type II fibers that are known to fatigue quicker than Type I muscle fibers.

The predominant treatment for OSA is with continuous positive airway pressure (CPAP) which is currently the standard of care. Treatment with CPAP significantly reduces the incidence of apneic events regardless of severity. A continuous positive pressure is generated by the CPAP machine and delivered from the machine through tubing to a facemask. The facemask is worn throughout the night with positive pressure applied to either the nasal or oral passageway that clears the airway and prevents any type of obstruction during the inspiratory part of the breathing cycle. Treatment with CPAP requires a mask to be worn throughout the night with a hose connected to a machine that can be troublesome for the patient or partner. Historically the treatment has been poorly tolerated due to its intrusive nature with patients complaining of feeling suffocated and uncomfortable. As a result, adherence and compliance rates are low. As a result of the intolerance to CPAP, alternative therapies have been developed that are more easily tolerated.

Genioglossus advancement surgery is one option where a surgeon will detach the chin bone and advance it forward so the lower jaw is also moved forward. This will decrease the degree of blockage, but in many cases may not resolve the disorder. This surgery in some cases may alter the structure of the patients face and appearance. Oral appliances such as Mandibular Advancement Devices (MAD) in a similar fashion move the mandibular forward to reduce the degree of blocking when the GG descends into the pharynx.

A relatively new therapy that adopts neuromodulation techniques is Hypoglossal Nerve (HPN) Stimulation. This emerging therapy uses an implanted pulse generator (IPG) like a pacemaker device implanted in the chest with leads extending from the generator up the neck to the hypoglossal nerve branch that innervates the GG muscle. An additional lead connects a respiratory pressure sensor to the intercostal muscle region to monitor respiration to ensure stimulation only occurs during inspiratory breathing to reduce the likelihood of GG exhaustion, which may already be fatigued due to excessive daytime activation or have an excessive number of type II muscle fibers. The first FDA approved neurostimulator for the treatment of OSA was developed by Inspire Medical, Inc. and includes a cuff electrode attached to the distal branch of the hypoglossal nerve that specifically innervates one side of the GG muscle. This is a Class III device as it is a permanent implant and due to the invasive nature of the surgery required to implant the device. While this therapy has been shown to be effective in treating OSA, it is extremely invasive where the patient will undergo surgical risk together with the potential of long-term adverse event complications common with surgical implant including infection, lead fracture and migration, corrosion and fibrosis. A patient will only be prescribed this technology if they cannot tolerate CPAP or are unwilling to be compliant.

Noninvasive neurostimulation approaches to treating OSA have been attempted throughout the years, mostly in academic settings. All have failed to achieve any level of significance. There are several reasons for said failures. Fundamentally, to achieve any degree of airway patency through stimulation, it is essential that the GG muscle be activated. To successfully activate this muscle, muscle motor points or the medial distal nerve branch of the HGN that controls the GG must be successfully activated. Successful activation requires that the correct locations are not only accurately targeted but stimulated in a way and with a level of stimulus that can trigger an action potential response resulting in the firing of motor fibers thereby causing a muscle contraction. This is exceedingly difficult under the circumstances in comparison to the invasive implant that wraps the stimulating electrodes around the nerve fiber responsible for contracting the GG muscle. Stimulating the muscle may only increase blood flow when stimulating in the wrong place. Even correct placement of electrodes is not sufficient due to constant movement through snoring and typical restless behavior seen during sleep particularly with OSA sufferers. The present invention describes an improved noninvasive neurostimulation apparatus to overcome the deficiencies found in the prior art.

SUMMARY

Embodiments described herein include closed loop systems and methods of monitoring GG muscle activity and providing feedback to select the optimal stimulation set of electrodes and determine optimal stimulus to deliver in real-time to maintain upper airway patency.

In preferred embodiments directed to treating OSA, EMG signals from multiple electrodes located in the submental region are collected and optimal sensing electrodes and optimal stimulation electrodes are determined. As stimulus is delivered to hypoglossal nerve via the optimal stimulation electrodes, feedback from EMG waveforms from the optimal sensing electrodes are used to control the stimulus in a closed loop system.

In additional embodiments include methods that utilize this EMG signal as a feedback process variable to control the amplitude of stimulation to the peripheral nerves. Other embodiments of the invention include how to determine the optimal sensing electrodes and optimal stimulation electrodes and being able to make updates to which electrodes are the optimal sensing and stimulation electrodes. Other embodiments of the invention discuss setting the proper frequency of the stimulation and detecting sleep. In other embodiments, the invention describes how the inhalation phases are determined. In another embodiment, the invention describes how sleep apnea events can be predicted.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF THE EMBODIMENTS

Figure 1:
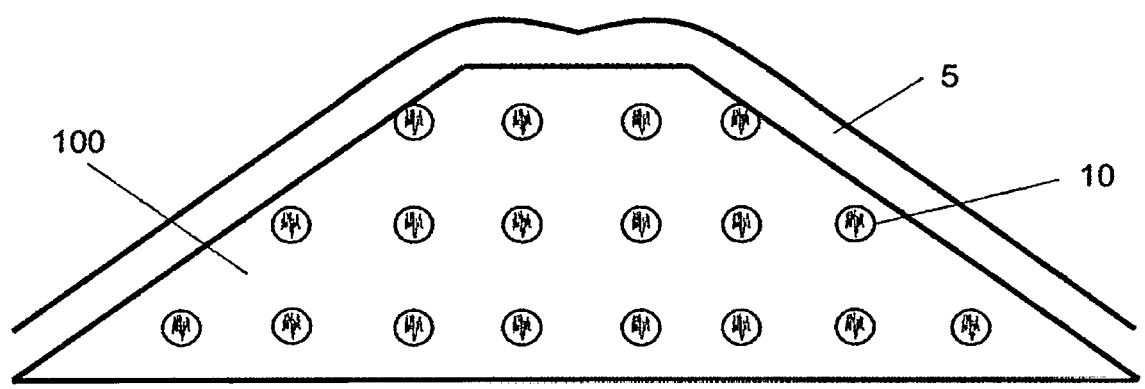
FIG. 1 illustrates a patch to worn in the submental region or oral appliance under the tongue containing uniformly spaced electrodes for EMG sense and stimulation of activation points according to one embodiment.

Specific embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention describes a non-invasive neurostimulation device and method that includes a smart system to locate and adaptively relocate the target points and provide feedback on a successful stimulation and energy delivery. According to the preferred embodiments of the present invention, a device for the treatment of OSA is described. GG muscle activity is specifically monitored from among the other upper airway muscles through maneuvers that generate an electromyogram (EMG) waveform with contribution mostly from GG muscle fibers. FIG. 1 shows electrodes 10 that are embedded in a patch or oral appliance 100, which is adhesively placed under the mandible 5 of an individual or inside the bottom of the mouth area through a dental appliance such as a mouth guard over the lower teeth where the electrodes 10 are spaced throughout the appliance and placed over the mandible 5 of the individual. In either embodiment, surface or intraoral electrodes 10 reside either on the skin surface under the GG in the submental area or above in the GG in the oral cavity under the tongue, respectively. The key is that patch/appliance allows the electrodes 10 to cover the area of the upper airway muscles, specifically the GG, and the left and right hypoglossal nerve terminals and GG motor points. In the preferred embodiments, the patch contains a matrix of uniformly spaced electrodes 10 that are used for both sensing EMG signals from the upper airway muscles and to stimulate the terminal branches of the hypoglossal nerve, and/or motor points on the GG muscle itself. In alternative embodiments, the electrodes 10 can be placed in a nonsymmetric pattern that would be closer together in certain areas and further apart in other parts of the patch 100.

A total of 19 electrodes 100 are illustrated in FIG. 1, with 9 working electrodes on each side and 1 reference electrode at the base on the patch or appliance 100, although greater or fewer may be used depending on the area below the mandible 5. The electrodes 100 are approximately separated 5 mm apart but the distance between the electrodes 100 can be anywhere between 1 mm to 10 mm. Typical EMG electrodes e.g. platinum, can be used for both measurement of EMG signals and for stimulation of tissue i.e. muscle motor points and efferent nerve fibers. In this example 18 unipolar signals will be acquired at a sample rate of 0.25-2 kHz. Bipolar signals will be derived from the unipolar signals of paired electrodes, as described in more detail below. Based on this symmetrical matrix configuration with equally spaced electrodes, muscle activity will be measured on each side. For example, the left and right GG muscle activity will be measured to determine which unipolar or bipolar electrode pairs are optimal for measuring the activity of the GG muscle during inspiration.

Figure 2:
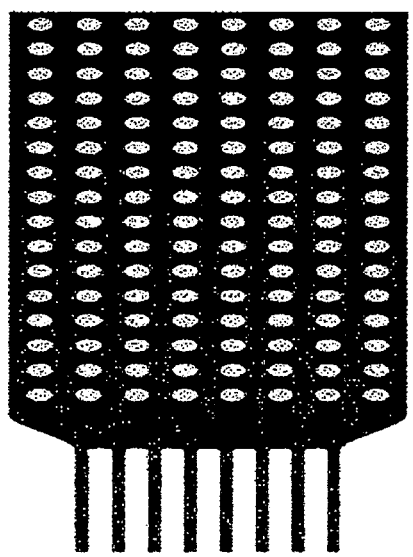
FIG. 2 illustrates an electrode patch configuration according to one embodiment.

According to one embodiment, the noninvasive electrode paths will have a custom arrangement as shown in FIG. 2, where the electrodes are either iridium, platinum or combination of both. Typically, manufacturers offer a large variety of electrode array designs for different applications combined with vast packaging options and connector types. In the case of the oral appliance, it will be similar but embedded in the plastic packaging. Simultaneous EMG signals can be acquired from each unipolar electrode. All electrodes measure muscle activity or EMG signals from a single electrode with respect to a common reference electrode. A bipolar signal, which is a local signal measured between any 2 electrodes can be derived by simply measuring the difference between 2 captured unipolar signals. This is a more flexible approach enabling more combinations to be derived without additional hardware providing any possible combination of electrodes. The electrode connector will connect each electrode to a data acquisition amplifier channel, where the EMG signal can be amplified and digitized.

Figure 3:
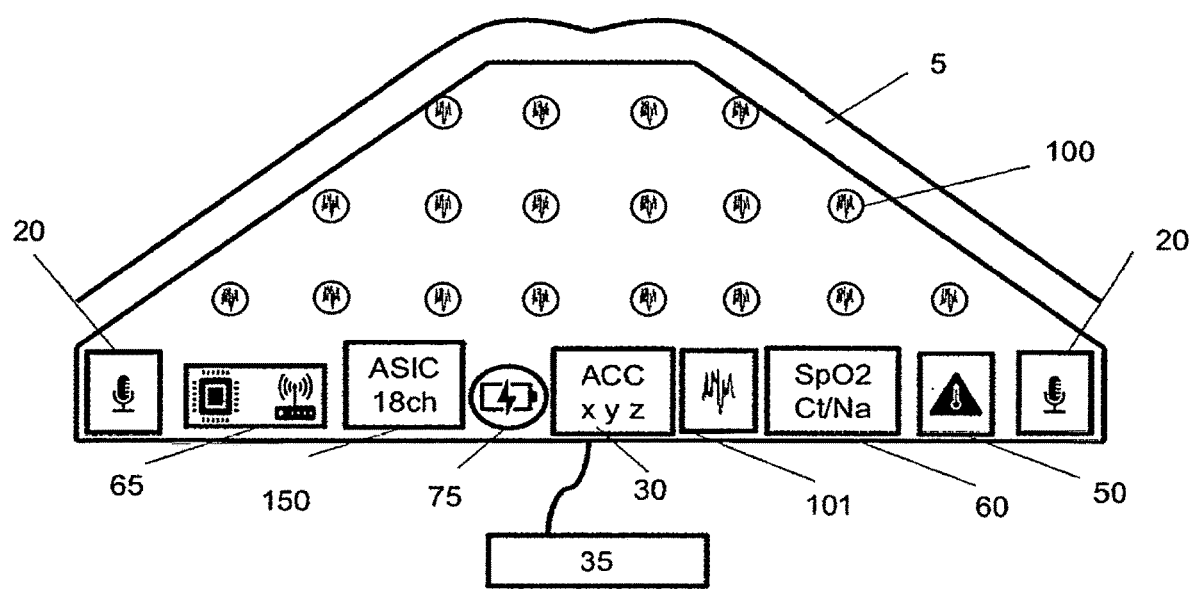
FIG. 3 illustrates an electronic schematic that describes various components linked to the patch or oral appliance of FIG. 1 according to one embodiment.

FIG. 3 illustrates an electrical schematic of additional components that would be connected to the patch 100 according to the embodiment of FIG. 1. The additional components can be located on the patch 100 (or appliance) itself or in a separate electrically connected device. Not all of the additional components would be required in a basic design of the present invention, but a key component required in all designs is a reference electrode 101, used to determine the signals at the working electrodes 100. Additional components include paired microphones 20 on each side of the throat to record sounds from the airway including but not limited to breathing from inspiratory and expiratory phases of the respiratory cycle; snoring, speech, choking, chewing, wheezing and coughing. A dual or 3-axis accelerometer 30 is in the center of the submental triangle. Its static gravity components are used to determine postures including upright, supine, prone, left and right sides. Static components can be derived from the raw accelerometer signals by low pass filtering. The posture identification is used to switch stimulation settings or switch off therapy if the patient does not have positional OSA (low number of apnea events when not supine). The accelerometer 30 can also be used to determine activity using the dynamic gravity component derived through high pass filtering and taking the modulus or square of the axes' residuals. Activities such as snoring, speech, breathing, coughing, and choking can be detected by the dynamic component. Activity resulting from an arousal from sleep associated with OSA can also be identified. Additional optional components include a temperature sensor 50, which can measure respiration, where a cable will connect the patch 100 to a separate sensor 35 which will reside under the nose and mouth region. Additionally, an SpO2 sensor 60 may be included to measure either oxygen desaturation from the carotid artery or nose area. Oxygen desaturation and esophageal pressure will provide a respiratory waveform. The system can use all sensors or only one to derive a respiratory waveform for the purpose of calculating optimal stimulation periods and apnea/hypopnea events.

Figure 4:
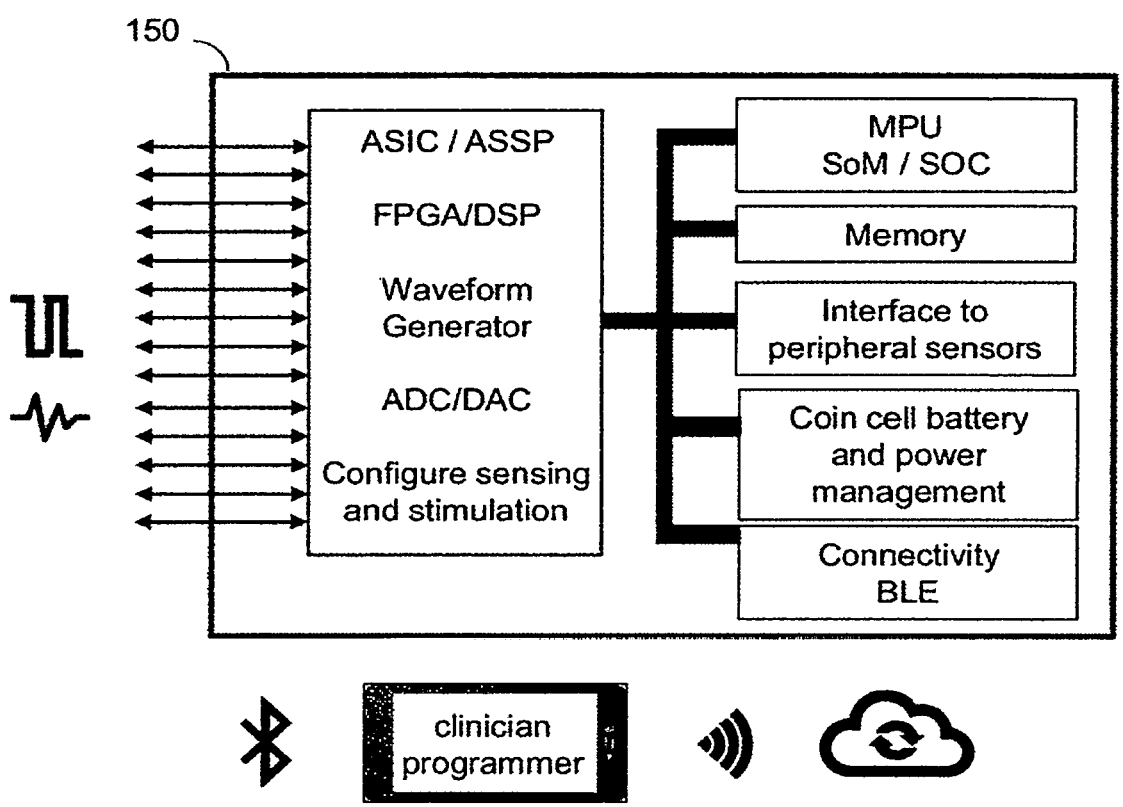
FIG. 4 illustrates a block diagram of controller unit, according to one embodiment.
Figure 5:
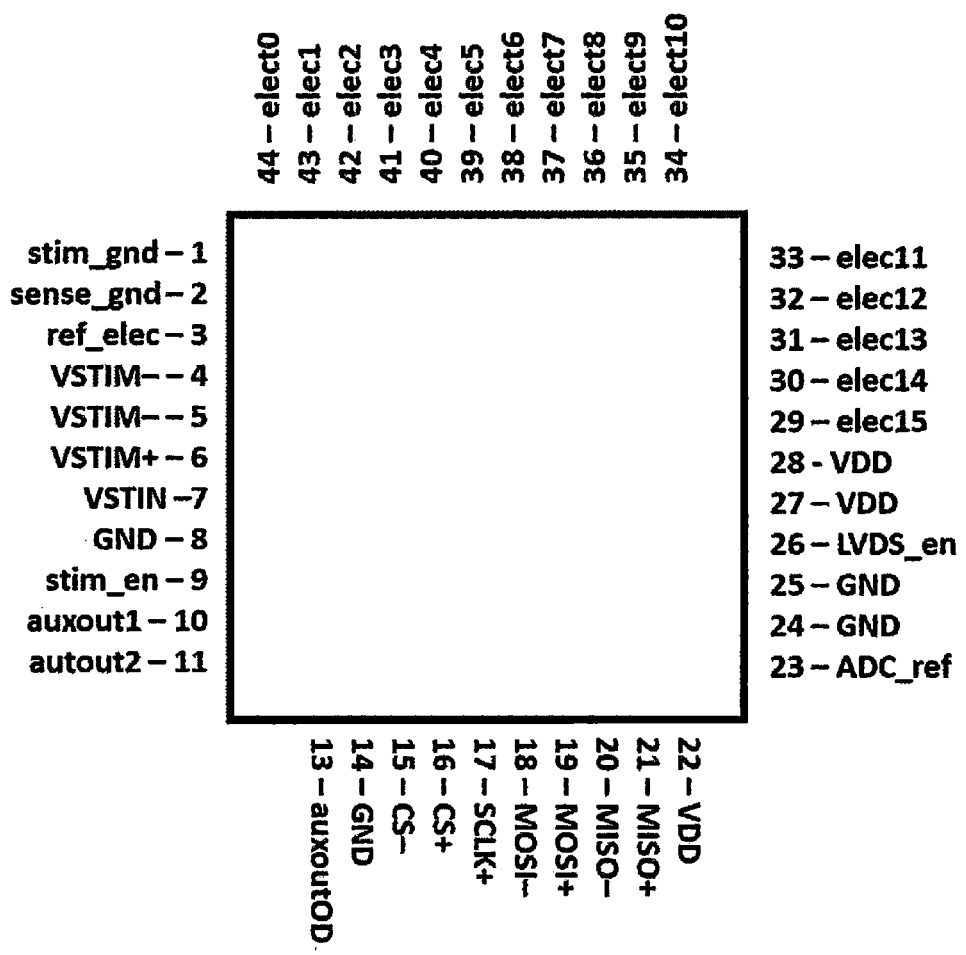
FIG. 5 illustrates an electronic schematic of the controller unit according to one embodiment.

The device is powered by a coin-cell battery 75, although power can be provided through a hard-wired connection to a device such as laptop, tablet, or primary cell battery. A Bluetooth SoC 65 allows communication with a separate device to transmit real-time data to a laptop or tablet or settings updated. The separate control device can interface directly with an accelerometer 30 acquiring digital data from the x, y, and z axes. Its analogue to digital (ADC) converters digitizes audio from the microphones 20 on either side of the trachea and embedded algorithms extract breathing waveforms through the sound envelope. A dedicated controller 150 is used to record EMG waveforms and apply stimulation. The dedicated controller 150 can be an ASIC, FPGA, SoC or other dedicated ICs. According to an embodiment of the present invention an 18 channel ASIC is used to control the electrodes 100. A typical block diagram and function of the ASIC embodiment is illustrated in FIG. 4, which includes the main processing blocks. The main processing blocks include: processor, memory, interfaces, power, and connectivity. An example of dedicated controller 150 is shown in FIG. 5, which is a fully integrated electrophysiology interface chip with 16 channels of low-noise amplifiers and constant current stimulators controlled by industry-standard serial peripheral interface. The array of 16 stimulator/amplifier blocks includes two amplifiers for sensing electrode voltages with an AC-coupled high-gain amplifier for observing small electrophysiological and a DC-coupled low-gain amplifier for monitoring electrode potential in response to stimulation. The high-gain amplifiers are referenced to a common, shared pin (ref_elec). In many applications, the reference electrode will also be used as the stimulation counter (return) electrode and will be tied to ground. Each channel has an independent stimulator module that can generate biphasic constant-current pulses with amplitudes varying from 10 nanoamps to 2.55 milliamps. These stimulators can maintain constant current output over a wide range of electrode voltages, with compliance limits near the stimulation voltage supplies VSTIM+ and VSTIM−.

A calibration phase is performed to determine the initial settings of the device. Calibration maneuvers are performed to activate the GG muscle and determine its location with respect to the electrodes to determine the best sensing electrodes to measure GG activity. As the GG signal is mostly present during inspiration where the muscle is innervated by medial branches of the hypoglossal nerve that cause the muscle to protrude, calibration is performed during inspiration phases. The signal is enhanced performing a maneuver by consciously forcing the tongue against the lower teeth and holding this position throughout the respiratory phase. This maneuver should be performed at least 3 times for 3 respiratory cycles. Waveforms from the 18 sets of unipolar electrodes 100 are stored and processed to determine the optimal bipolar GG electrode for both the left and right GG side. The optimal electrodes can be more easily identified by applying greater force to the lower teeth. Once the GG muscle activity is identified and can be monitored with the identified electrodes, it is possible to deduce successful activation of the muscle through stimulation. Closed loop stimulation can then be performed with GG muscle EMG signal as feedback.

During the calibration stage, the optimal stimulation setpoint can also be determined. The setpoint is set based on calibration data by analyzing the maneuver that requires between approximately 25-50% force when protruding the tongue against the lower teeth. Then calculating the peak of the GGAV envelope waveform generated over 3 breaths during the inspiratory phase. This will vary for everyone and can be adjusted manually if necessary either by the user or medical professional during an appointment. The user will thus be titrated constantly at this rate while prompting the user for feedback on any sensations they may feel from the skin. Systems employing submental transcutaneous stimulation are susceptible to arousals, resulting from sensations triggered by stimulating low-threshold (high-sensitivity) encapsulated mechanoreceptors, particularly when cycled on and off with the inspiratory phases of respiration. There are 4 major types of encapsulated mechanoreceptors: Meissner's corpuscles, Pacinian corpuscles, Merkel's disks, and Ruffini's corpuscles that generate action potential responses relaying sensation information to the central nervous system in response to touch, pressure, vibration, and tension. All low-threshold mechanoreceptors are innervated by relatively large myelinated Aβ fibers axons. Meissner corpuscles react to vibrations from touch at approximately 50 Hz. Pacinian corpuscles react to skin vibration of around 200-300 Hz. The frequencies will vary inter-subject; therefore, it is optimal to tune and personalize each subject's settings. Any tongue movement or tightening sensations are acceptable at this point as therapy will only be administered during sleep (discussed in later sections). Any sensation of the skin which could cause discomfort or arousal from sleep can happen at lower frequencies. Therefore, the stimulation frequency is increased until the sensation reduces sufficiently and is tolerable, or the maximum stimulation frequency threshold is reached.

The optimal stimulation electrodes my vary due to movement and therefore feedback is necessary to determine the optimal electrodes and sufficient stimulus to perform in real-time. According to further embodiments of the present invention, various maneuvers for each posture (supine, left, right, prone) can be performed to aid in the identification of the optimal electrodes to track GG activity for each position. If the patient has positional OSA, whereby their apnea hypopnea index (AHI) is at least 50% less when not in the supine position, and their AHI is considered normal in other postures then stimulation will not be activated in the unnecessary positions. AHI is a measure of the average number of apnea and hypopnea events per hour determined by a sleep study. Apnea is a complete blockage whereas a hypopnea is a partial blockage of the upper airway. Closed loop control will be applied with a setpoint of approximately 25-50% force to gently move the GG forward slightly without disturbing the subject and risking an arousal or tongue abrasion. The maneuver is repeated and the setpoint amplitude will be captured from the optimal sensing electrodes to be identified offline (not in real-time).

Figure 6:
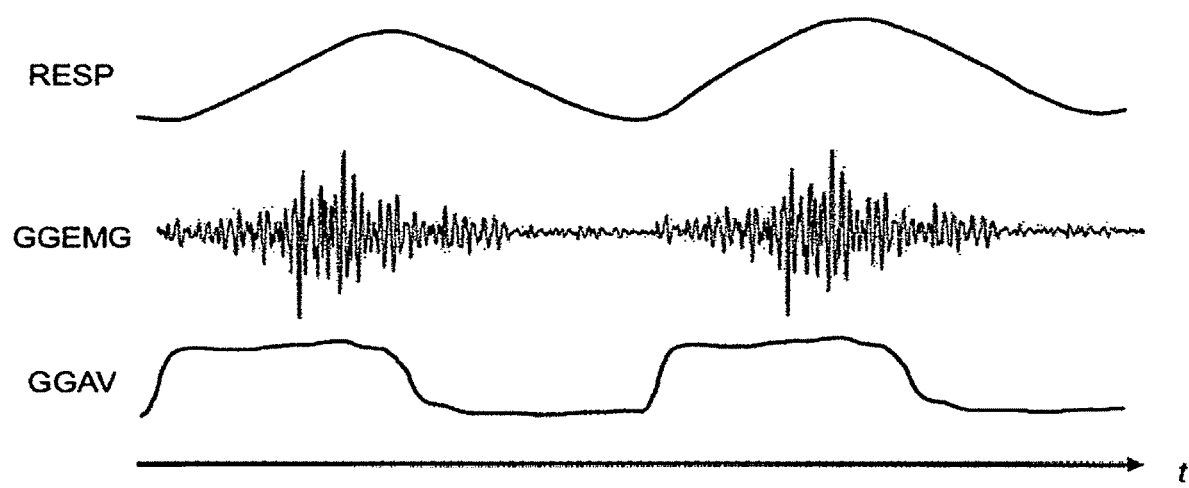
FIG. 6 illustrates a typical genioglossus EMG waveform during sleep illustrating stationary respiration.

A stationary respiratory signal is illustrated in the first trace of FIG. 6 that is typical of an effort sensor waveform captured from the torso or ribcage area, or an actual tidal volume waveform derived by integrating a flow signal from a spirometer. The following waveform GGEMG represents the EMG signal captured from the designated sensing electrodes or set of electrodes from one side and is followed by a running average of the signal capturing the amplitude envelope GGAV. The signals illustrate GG activity during the inspiratory phase of the respiratory cycle and a decrease in activity during the expiratory phase.

Figure 7:
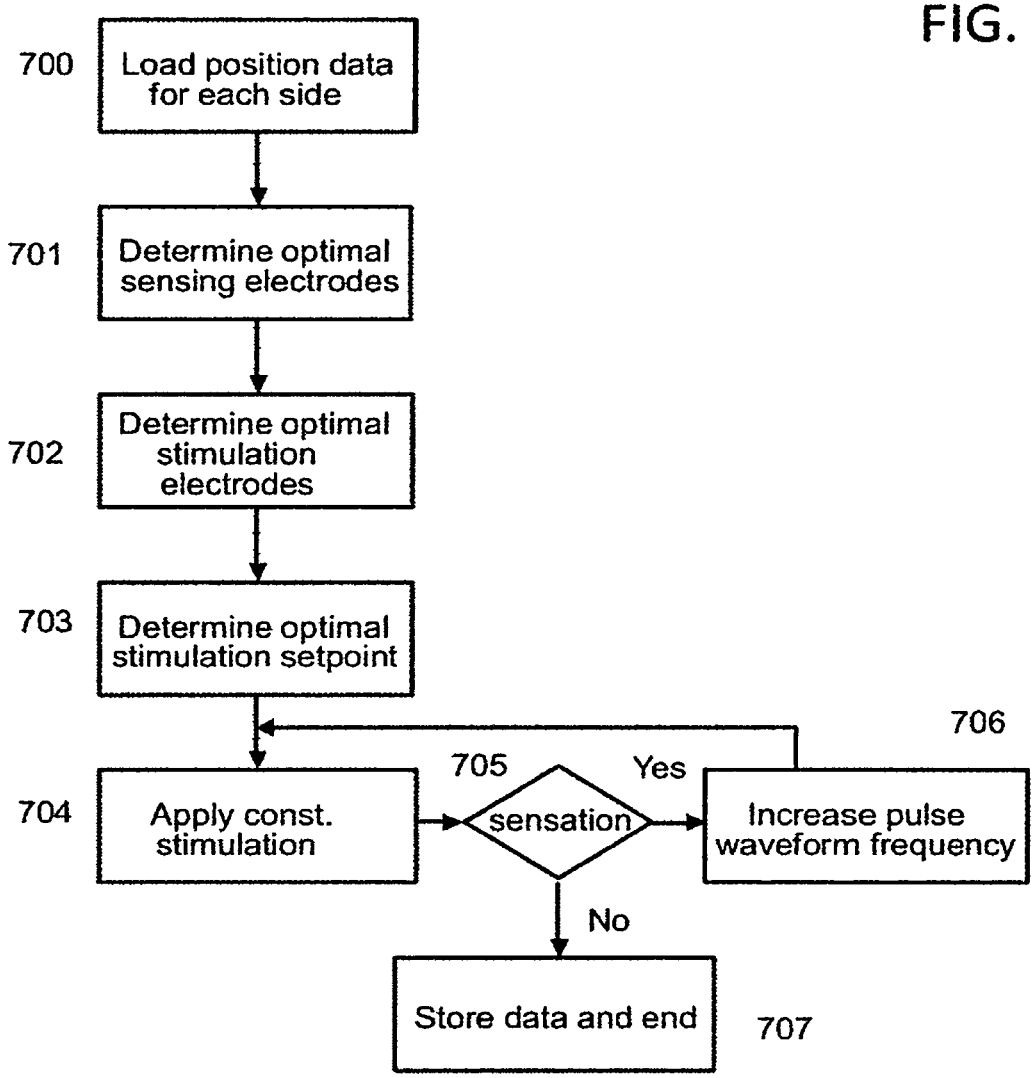
FIG. 7 illustrates a flowchart outlining the initialization process using calibration data to determine the optimal sensing and stimulation electrodes, with setpoints calculated for optimal stimulus according to one embodiment.

Upon activation of the device, the initialization process begins as illustrated in FIG. 7. Waveform data which has been stored from the calibration phase is loaded at block 700 to determine for each posture and GG side: optimal sensing electrodes at block 701, optimal stimulation electrodes at block 702, setpoints at block 703 and pulse waveform stimulation frequency at block 704, 705 and 706. The bipolar electrode pair with the greatest energy for each posture is determined to be optimal for measuring GG activity that can be determined by measuring the amplitude of the GGAV waveform and stored at block 707. Alternatively, a combination of electrode pairs could be utilized if sufficient energy exists in other pairs, which could be combined and optionally weighted. Other maneuvers can be performed to identify other muscle groups, e.g. swallowing and voice production maneuvers to identify the GH, tongue retraction to identify the styloglossus muscle or depress and retract to identify the hyoglossus muscle.

Alternatively, each EMG signal can be identified by applying pattern recognition routines, where each individual muscle is classified from the signals acquired for each maneuver during the calibration phase. Machine learning using Support Vector Machines (SVM) for instance can be trained to differentiate between each muscle. Alternatively, other routines could be applied such as neural networks, dynamic programming techniques and the like. Moreover, different muscles have different firing rates and likely differing fibers (type I and II). It is believed that many OSA sufferers have type II muscle fibers which exhibit a more powerful faster twitch but fatigue quicker. Tonic and phasic muscles will have a different profile as phasic tends to have a higher frequency.

Other techniques can be employed offline from the stored data to identify the GG. For example, the data can be interpolated and each bipolar pair cross-correlated to track the direction of conduction along the muscle. Bipolar pairs with strong correlation (r>0.7) will indicate muscle fibers firing from the same muscle and can tracked as the EMG wavefront propagates. In the case of the GG muscle the EMG should propagate from the anterior in the posterior direction. Conduction velocities of approximately 2-3 m/s have been identified in the GG, therefore, for electrodes spaced 5 mm-10 mm apart the M-wave should appear approximately (2*0.005s–2*0.01s) 10 ms-20 ms/cos(theta), where theta is the angle the GG follows medial to the chin. By plotting a line for each GG pair, based on the maximum correlations (r>0.7) for bipolar measurements, we can determine the location of the GG pairs, and measure the GG activity by measuring the EMG signal from all electrodes closest to the target muscles.

Figure 8:
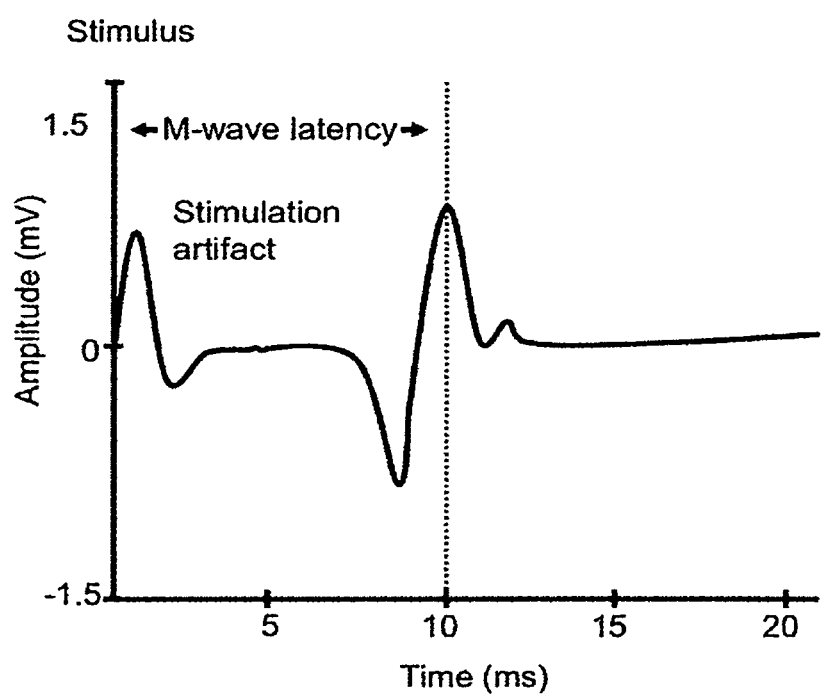
FIG. 8 illustrates the Genioglossus M-wave and stimulation induced artifact following stimulus according to one embodiment.

The identified sensing electrodes aid in determining the most effective stimulation electrodes. These electrodes are monitored while one to multiple pulses are delivered to each set of bipolar pairs to measure the amplitude of the M-wave produced at the sensing electrodes. This process we refer to as pinging the electrodes. An example is illustrated in FIG. 8 where a single stimulation pulse triggers an M-wave recorded in the sensing electrodes. A measuring window is applied that is between 5-20 ms to avoid any stimulation artifact in the recorded EMG waveform. The bipolar electrode pairs receiving the pings left and right of the medial submental region that generate the greatest amplitude are selected as the optimal stimulation electrodes.

Figure 9A:
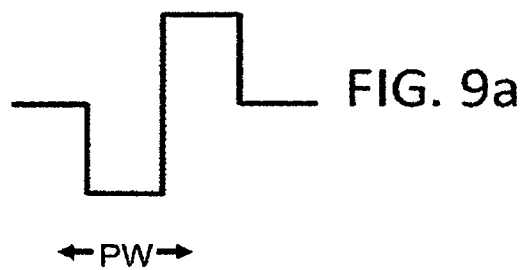
FIG. 9a illustrates a balanced cathodic pulse waveform according to one embodiment.
Figure 9B:
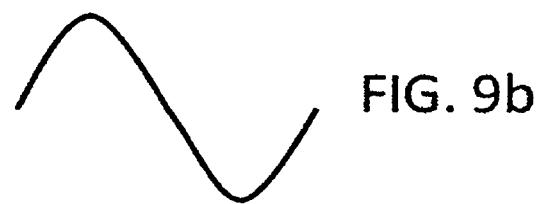
FIG. 9b illustrates a sinusoidal stimulation waveform according to one embodiment.
Figure 9C:
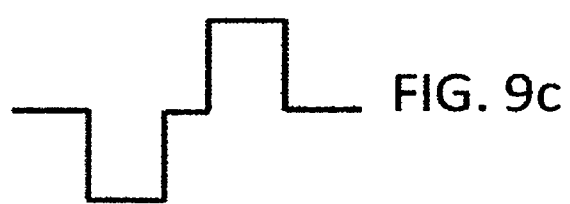
FIG. 9c illustrates a balanced cathodic delayed waveform according to one embodiment.
Figure 9D:
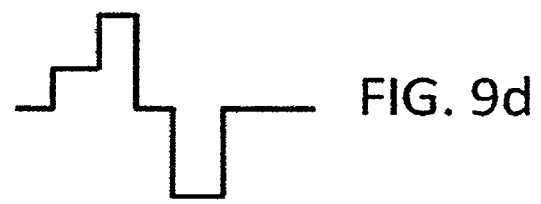
FIG. 9d illustrates an anodic primed waveform according to one embodiment.

Several stimulation waveform patterns may be applied to the HGN or GG motor points. Four waveforms are presented that are all biphasic, charge balanced and are either cathodic (FIGS. 9a & 9c) or anodic (FIGS. 9b & 9d), where FIG. 9b is different in that it is sinusoidal in nature, where it has been suggested that sinewaves can avoid activating sensor receptors that could trigger an arousal from sleep. Moreover, based on the current perception threshold (CPT) theory sinewaves at 2 kHz may activate Aβfibers for pain management. Balanced waveforms are applied to reduce side effects, tissue, or electrode damage by approximating zero residual voltage and zero net faradic charge transfer. FIG. 9c illustrates an inter-phase delay which can be especially useful if the stimulation energy delivered just exceeds the action potential threshold, thereby increasing the likelihood of generating an action potential. The delay per se minimizes the threshold while maintaining the anticorrosive effect of the charge recovery phase between cycles. Moreover, the waveform of FIG. 9d shows a biphasic anodic balanced waveform with a sub-threshold depolarizing pre-pulse that has been shown to enhance stimuli response. The pre-pulse is delivered immediately prior to the stimulation waveform and has the effect of altering the characteristics of the action potential and motor point thresholds. The inter-phase delay further enhances the stimuli response, prior to the charge recovery phase.

Main Process

Figure 10:
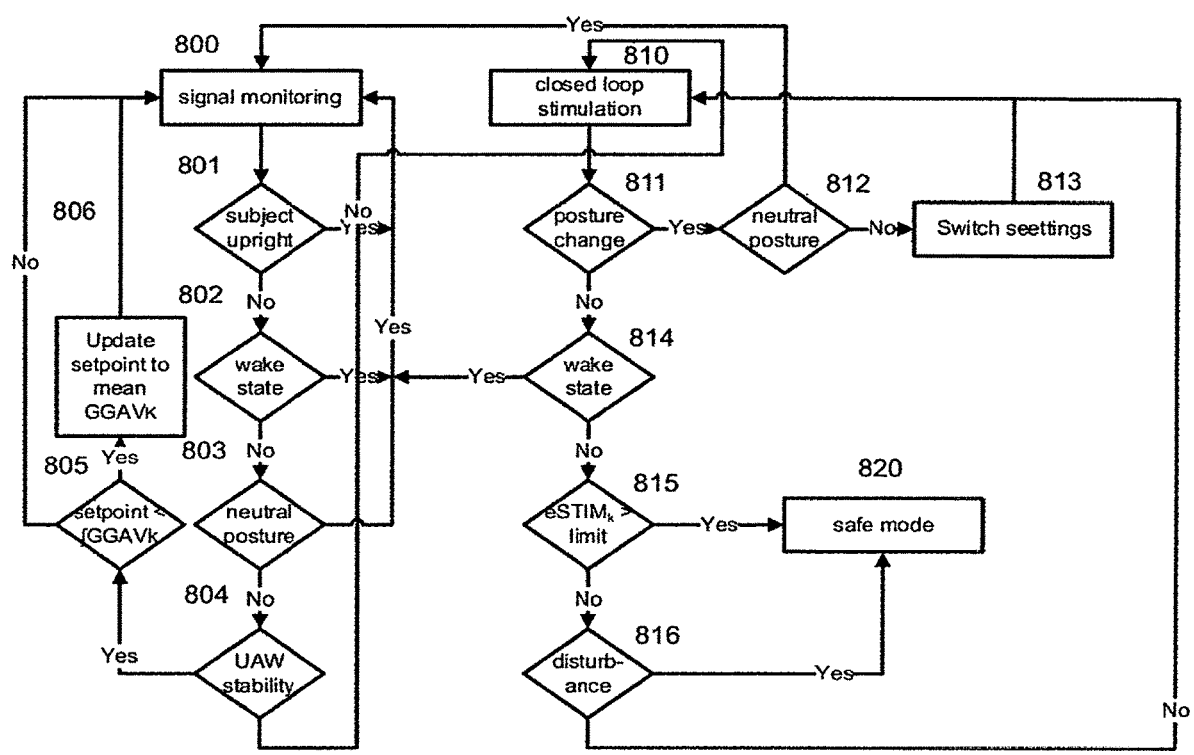
FIG. 10 illustrates a system routine showing the entry procedure into closed loop control of the upper airway and exit process from closed loop control according to one embodiment.

The flowchart illustrated in FIG. 10 outlines the main system process of maintaining upper airway patency. A calibration and initialization phase has been described in previous sections that determine the optimal electrode pairs to measure muscle activity, such as the GG. The processed EMG signals with amplitude envelope showing the greatest responses are determined to be the optimal bipolar pairs. Specialized waveforms applying bipolar stimulation with a biphasic pulse sequence with delay following the proceeding pulse are used. The biphasic pulse provides faster tissue recovery time from the stimulation with charge balancing while the interphase delay and pre-pulse provide greater stimuli response. The main system process starts with a signal monitoring phase 800 where signals are acquired from all available sensors and processed to provide waveforms for real-time analysis. Closed loop stimulation therapy 810 will not commence until certain conditions are met. Firstly, to ensure patient comfort, it is ideal not to stimulate during wake periods. The subject can therefore not be upright 801 which immediately indicates wake state. Secondly, the subject must be in a sleep state 802—ideally a stage beyond alpha. Sleep state is determined through the analysis of respiratory waveforms, that could be derived from the GGAV waveform, processed audio, nasal/oral breath temperature, pulse oximetry plethysmogram, esophageal pressure or any respiratory sensors. Sleep state is determined through analysis of variation in the respiratory signal.

Figure 11:
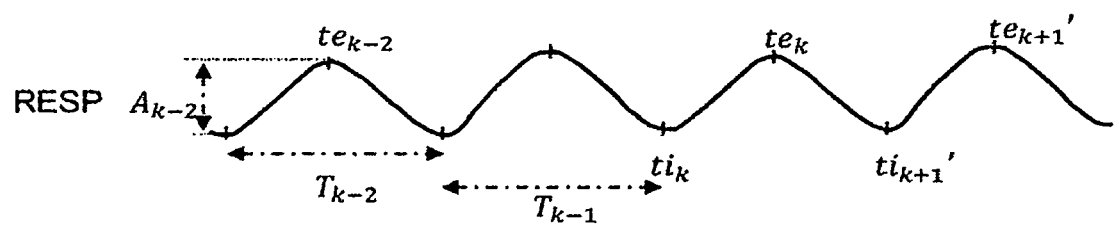
FIG. 11 illustrates the respiratory signal and indices derived to calculate stimulation times according to one embodiment.

Respiratory waveforms during the awake state can exhibit considerable variation. For example, during voluntary breathing, inspiratory cycles can be of short duration and high amplitude to achieve the necessary tidal volume, or of low amplitude and long duration to achieve the necessary oxygen consumption that the body requires. Short inspiratory cycles and long expiratory cycles are often seen during speech, which can vary considerably based on a conversation for instance, where a deep breath is taken to prepare for the delivery of a spoken sentence. Conversely, during sleep, a cyclo-stationary pattern is seen that resembles a periodic sinewave, as illustrated in FIG. 11. Therefore, the onset of sleep can be identified by measuring the variation in the complete breathing cycle, in the inspiration and expiratory durations, and the amplitude of the tidal volume measurements. A significant decrease in the amplitude and frequency variations can determine sleep versus wake states and potentially sleep stages. To determine sleep, amplitude and frequency variation are assessed where the subject must not be in the upright position as determined by the accelerometer. Sleep is determined by a decrease in respiratory frequency and tidal volume variation from breath to breath. The amplitude of both EMG and audio signals can be applied as a unitless measure of tidal volume, and respiratory frequency from each signal also, where the inspiratory phase of the respiratory cycle can be identified from the microphone signal and distinguished from the expiratory phase using the GG EMG signal.

As previously mentioned, respiratory waveforms such as pressure and tidal volume are cyclo-stationary during sleep with relatively small variation between volume and frequency from cycle-to-cycle. The respiratory waveform (RESP) illustrated in FIG. 11 demonstrates this typical cyclo-stationary pattern. Here the amplitude of the $k^{th}$ cycle is represented by $A_k$, cycle time $T_k$, and the inspiratory and expiratory times by $ti_k$ and $te_k$, respectively. Sleep state can be determined by monitoring the variation in cycle-to-cycle amplitude (EQ. 1), frequency (EQ. 2), or a combination of both (EQ. 3) over N cycles:

$$\Delta T_k = \sum_{n=k-N}^{k} T_n - T_{n-1} \quad (1)$$

$$\Delta A_k = \sum_{n=k-N}^{k} A_n - A_{n-1} \quad (2)$$

$$V_k = p\Delta T_k + q\Delta A_k \quad (3)$$

where p and q are coefficients with values between 0 and 1 that provide some level of contribution from either volume or frequency to the variance calculation. i.e. if p=q, there is an equal contribution, and if either p or q have a value of zero, they provide no contribution to the variance calculation.

If the subject is determined to be asleep the next step as illustrated in FIG. 10 is to determine if the subject is experiencing upper airway (UAW) instability 804. As described earlier, OSA resulting from upper airway instability occurs when there is a reduction in force required to keep the GG in place during inspiration due to either a decrease in neural drive or muscle fatigue resulting in a diminished GG EMG. To determine this state the energy in the GGAV waveform respiratory phases are compared. The inspiratory phase area under the curve, average, median or peak should be at least twice that of the expiratory phase when operating in a stable state. Additionally, changes in the average GGAV waveform per breath k, ($\overline{GGAV_k}$), will demonstrate an instantaneous loss of GG innervation further indicating upper airway instability. When it is determined that the upper airway is not stable through diminished GG EMG signal, through one of the calculations described above, the system will enter the main routine that is closed loop stimulation mode 810.

To prevent muscle fatigue during closed loop stimulation mode, stimulation is only applied during the inspiratory phase of the respiratory cycle. Continuous stimulation throughout the night is not possible as upper airway muscles will fatigue. Therefore, it is essential to rest the muscles during the respiratory cycle by only stimulating during the inspiratory phase when airway obstruction could occur. As the goal is to maintain upper airway patency, and prevent an obstruction, rather than recover from an airway block, it is advantageous to stimulate prior to the onset of inspiration. Moreover, as the processed respiratory waveform will be delayed due to several factors such as the sensor used, the mechanical effects of respiration, digital filter group delay. To predict the onset of inspiration, we use knowledge of the previous cycle time and the average respiratory rate or cycle time previously calculated to estimate the onset of the next inspiratory cycle. As it is critical that stimulation occur before the end of expiration. A margin of error is either calculated or fixed to ensure success. This margin of error can be calculated based on the level of confidence that the inspiratory time estimate will be good. The level of confidence can be based on but not limited to the variance in cycle-to-cycle time, where low variance would provide high confidence in the calculation, and higher variance would mean a lower confidence and therefore a greater error margin and offset to be subtracted from the inspiratory time prediction and therefore earlier stimulation start time. The predicted inspiratory onset is denoted in FIG. 11 by $ti_{k+1}'$ and is calculated as:

$$ti'_{k+1} = te_k + (ti_k - te_{k-1}) - e$$

where e signifies error or the level of variance, with high variance meaning high error and larger correction factor to ensure stimulation starts prior to the beginning of inspiration. Should the variance be low, then a fixed offset e is applied such as 100 ms which is ample but minimal. If the variance is exceedingly high but still considered in the sleep state, then constant stimulation i.e. through the expiratory phase for a short time period or until the respiratory cycle variance is lower.

The amount of stimulation energy to deliver is determined through closed loop feedback 805 and can be determined on each respiratory cycle. Stimulation waveforms have been discussed previously, where the pulse amplitude or pulse width must be great enough to protrude the GG muscle. The mean of the GGAV signal provides the best process variable. The ideal threshold of the GGAV signal (on either side) can be set early in the night 805 when the subject has fallen asleep and no apneic events have occurred 804. Once OSA events occur 810 stimulation is applied continuously for a short period to bring the GGAV signal back to a normal level and then revert to closed loop stimulation throughout the inspiratory cycle only. The stimulation amplitude or pulse width is increased or decreased on each cycle until reaching the ideal GGAV threshold.

In order to ensure stimulation artifact such as that shown in FIG. 8, does not affect deriving an accurate GGAV signal, the GG EMG signal is sampled in a window. The window is the time period where EMG activity is recorded and processed to provide one sample of the EMG amplitude envelope illustrated in FIG. 12 and will therefore have a considerably lower sample rate than the EMG signal, and equal to the stimulation frequency. Two typical respiratory sleep cycles are illustrated FIG. 12. As previously mentioned, during sleep state the abdominal muscles dominate, and respiratory tidal volume signals are cyclo-stationary appearing nearly sinewave like in nature. The upper trace (RESP) is a typical tidal volume signal during sleep with a frequency of 0.25 Hz (t=4 secs) and normal breath rate of 15 breaths per minute. The following trace illustrates a normal GG EMG signal with the likely contribution from other upper airway muscles such as the GH muscle. The average EMG signal is illustrated next, where the trace GGAV could be a running average, a median filter, a peak or low pass filtered capturing the signal envelope. In this case the signal is time averaged. Clearly this trace can be used to determine inspiratory and expiratory times, where he see a high level of EMG activity during inspiration and significant decrease during expiration. The third trace shows the pulse waveform used for stimulation. The waveform has been previously described, where EMG measurements proceed the settling of stimulation artifact and precede the next stimulation cycle. The stimulation frequency in this case is Fp=15 Hz or 67 msec cycle length but can range from at least 2 Hz to greater than 500 Hz. Therefore, a GG EMG signal segment can be acquired every 67 msec. By processing the raw GG EMG signal segment sample, either by averaging, or taking the median or peak M-wave. An average is expressed in EQ. 4 to derive the signal envelope:

$$GGAV_n = \sum_{k=(n-1)m}^{nm-1} GG_k, \; m = Fs/Fp \quad (4)$$

where the GGAV trace illustrates the GG signal envelope sampled at 15 Hz in line with the pulse stimulation frequency and Fs is the sample rate of the EMG signal. However, this sample rate could be increased due the typically low duty cycle and short pulse width relative to the full cycle.

Figure 12:
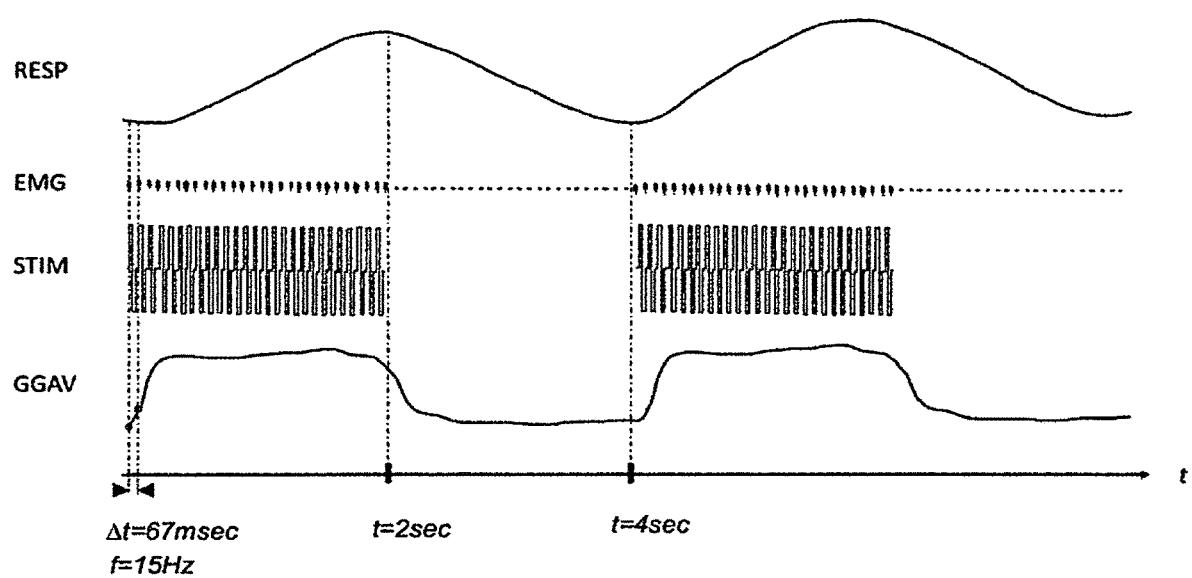
FIG. 12 illustrates the derived genioglossus EMG amplitude envelope waveform according to one embodiment.
Figure 13:
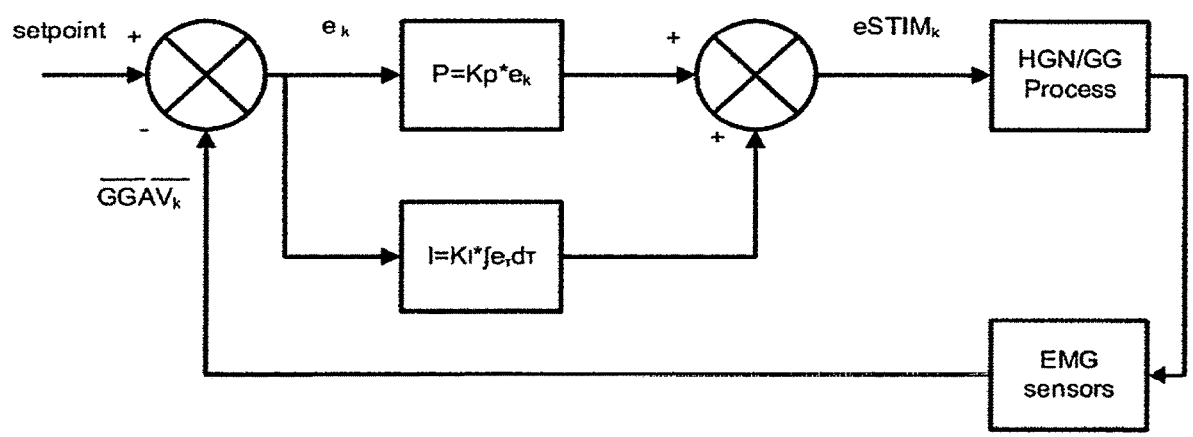
FIG. 13 illustrates a PI controller adapted at the respiratory rate to a setpoint calculated during calibration or during sleep with upper airway stability according to one embodiment.

The closed loop control process is illustrated in FIG. 13 in the form of a PI controller, where the setpoint is set initially during calibration and updated during sleep periods with no upper airway instability, and is never reduced retaining only the maximum value calculated, as was presented in FIG. 12. The process variable $\overline{GGAV_k}$ is the average of the GGAV signal for each breath k, $K_P$ and $K_I$ are the P (proportional) and I (integral) control gains, respectively. The controller output $eSTIM_k$ is either the amplitude of the pulse waveform amplitude (mA), or length of the pulse width (us) expressed in the EQ. 4 for the GG left and right sides:

$$eSTIM_k = K_p(SP - \overline{GGAV_k}) + K_I\left(\sum_{n=k-N}^{k} SP - \overline{GGAV_k}\right) \quad (4)$$

The controller output is calculated for every breath and optimal stimulation applied. In other embodiments a P controller would suffice, and possibly a PID or model predictive control (MPC) or on/off based approach.

During closed loop control stimulation, the subjects' posture 811, sleep state 814, controller output 815 is all checked continuously. A posture change to a neutral position 812 where a subject does not have positional OSA and low AHI on one of their sides, the system will exit closed loop control 812 halting stimulation and returning to monitoring signals 800 awaiting change. Alternatively, with positional OSA new settings will be loaded for that posture and closed loop control will continue. Likewise, if the subject awakens 814, closed loop is halted, and monitoring ensues 800. If the output of the controller exceeds a threshold 815 (e.g. >30 mA) that could cause tissue damage over time, a safe mode 820 is entered. During the closed loop stimulation phase disturbance monitoring is performed that could affect closed loop control. Disturbances such as an apnea or hypopnea event characterized here as a cessation of breathing for longer than 10 seconds, which is measured as a significant reduction in tidal volume (90% from previous breath for apnea and 60% for hypopnea) measured with either of the aforementioned respiratory sensors. Arousal from sleep can be identified by a sudden motion recorded as high activity on the accelerometer. Snoring can be detected with the audio in a frequency range 0.2-2 kHz. Chocking and other audio related events are also considered disturbances. In all cases control moves into a safe mode outlined in FIG. 14.

Figure 14:
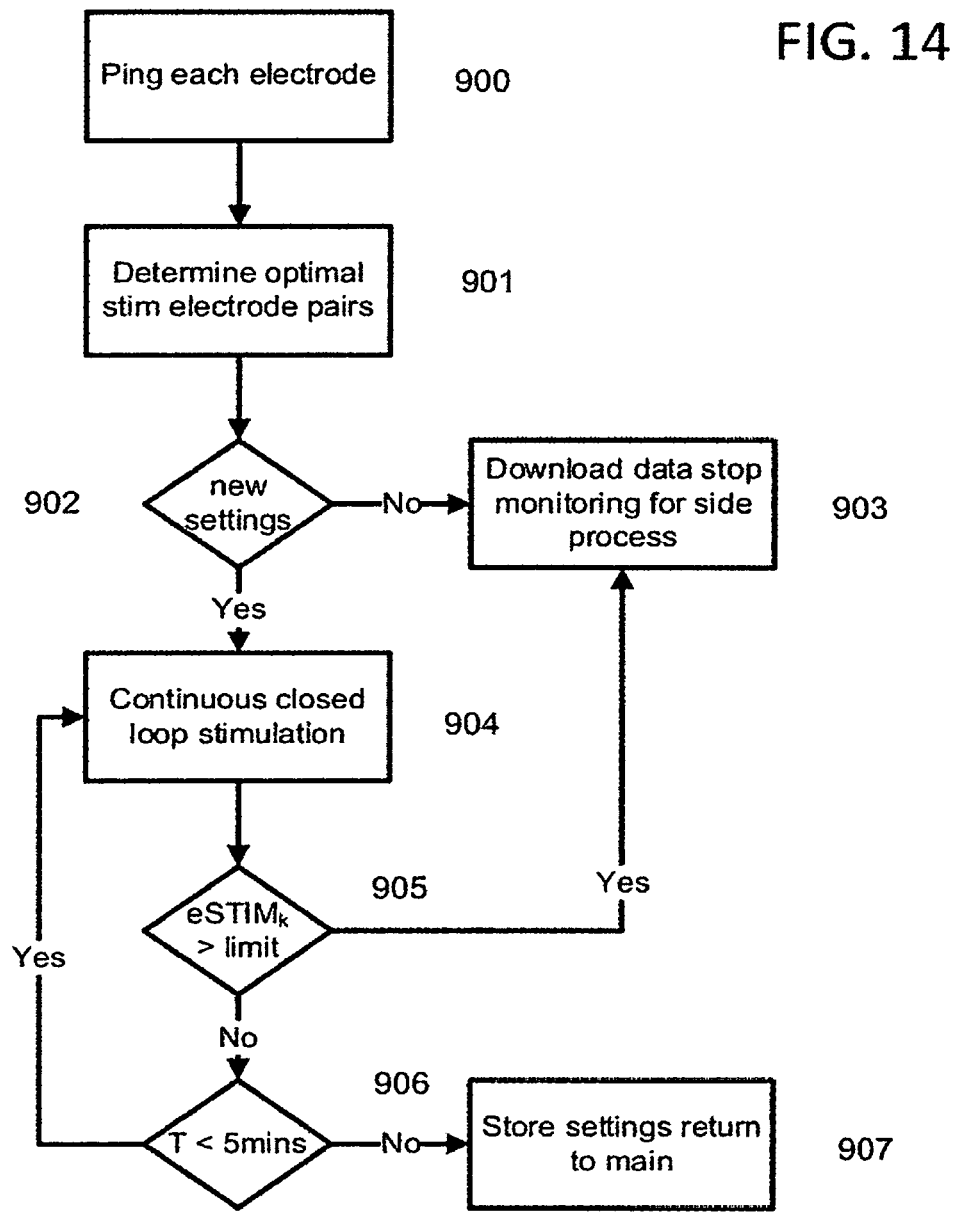
FIG. 14 illustrates a safe mode operation applying continuous stimulation for recalibration purposes according to one embodiment.

The flowchart illustrating the safe mode process is illustrated in FIG. 14. The first step is to determine if an effective set of stimulation electrodes can be identified 901. This is accomplished by pinging 900 with 1 or multiple pulses each set of bipolar paired electrodes and measuring the resultant M-wave on the sensing electrodes. If a new set of electrodes cannot be identified, the stimulation process for the side being treated with stimulation is stopped 903. The other side at this point is hopefully still effectively providing stimulation therapy. If a new set of stimulation electrodes can be identified continuous stimulation 904 is initiated throughout both the inspiratory and expiratory phases without interruption to rest the muscles. This is safe for a short period of time, in this case approximately 5 mins 906, and will clear any obstructive apnea events if the triggering disturbances 907 were due to arousals, snoring or an apnea/hypopnea event unsuccessfully treated. During this period of constant stimulation, 904 the controller output is monitored 905 to ensure the titration levels remains within safe limits and will exit the process 903 if the controller cannot achieve the setpoint within reasonable limits due to system error.

The process of identifying optimal sensing and stimulation electrodes, together with personalized closed loop control titration can be applied to other neuromodulation therapies such as treatment of overactive bladder (OAB) with percutaneous tibial nerve stimulation (PTNS) and the management of neuropathic and nociceptive pain. Neuromodulation is a common therapy to treat pain, mostly with implanted pulse generators (IPG). Spinal cord stimulation (SCS) is the largest of the neuromodulation markets where IPGs are employed to treat a variety of pain conditions. One of the mechanisms of action to control pain based on stimulation is described by the gate control theory which blocks pains signals with paresthesia, and the other involves high frequency stimulation above 10 kHz to excite inhibitory neurons. While we want to avoid stimulating certain sensory mechanoreceptors in the treatment of OSA, we want to stimulate such fibers in the treatment of pain.

Primary afferent nociceptive fibers are responsible for transmitting to the central nervous system (CNS) fast intense pain nerve impulses via small myelinated Aδ fibers with moderate conduction velocity, and slow chronic throbbing pain nerve impulses via small unmyelinated C fibers with slow conducting velocity. Spinal cord transmission cells relay this information to the brain with the dorsal horn acting as the gating mechanism. Based on gate control theory, increasing excitation of the transmission cell increases pain stimuli throughput to the brain and heightened pain perception, while a reduction in transmission cell activity through inhibition of the transmission cell has the effect of decreasing pain perception. Inhibition of the transmission cell can be achieved through competing stimulus of medium sized and moderate conduction velocity nonociceptive Aβ fibers responsible for touch and pressure sensations and along with other motor functions. Here Aβ fibers indirectly inhibit transmission of pain signals from the C fibers by closing a gate of the transmission cell responsible for relaying pain signals to the brain.

Figure 15:
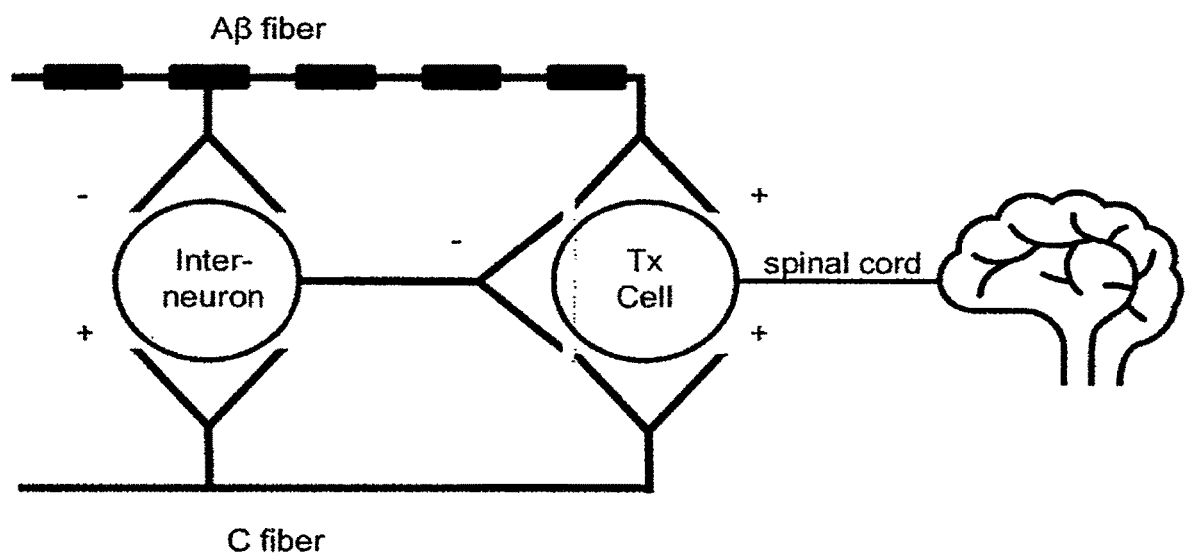
FIG. 15 illustrates a gate control theory for pain according to another embodiment.

Gate control theory is based on the presence of an inhibitory interneuron connection with Aβ, Aδ and C fibers that forms a synapse on the same transmission cell that can reduce the likelihood that the transmission cell will fire transmitting pain stimuli to the brain as shown in FIG. 15. When the inhibitory interneuron fires through the excitatory connection with the interneuron the likelihood of the transmission cell firing is reduced, and conversely, C fiber firings may inhibit the interneuron increasing the transmission cells likelihood of firing and sending pain signals to the brain. Therefore, depending on the firing rates of Aβ and C fibers in this example, the transmission cell will be excited or inhibited. As illustrated in FIG. 15, when the Aβ fiber is more active than the C fiber the inhibitory interneuron input is net positive creating an inhibition effect on the transmission cell. Conversely, if the interneuron input is net negative.

Figure 16:
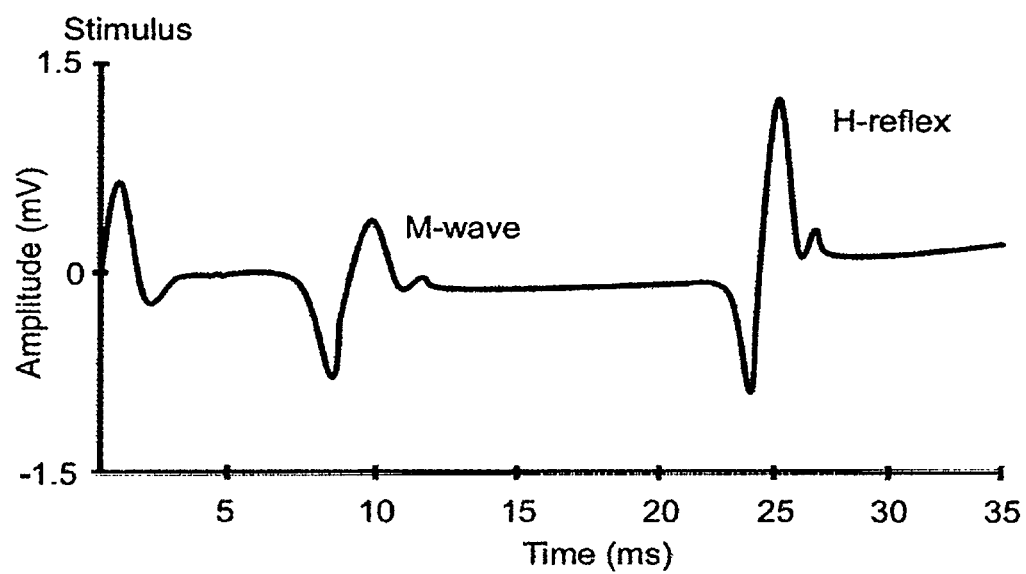
FIG. 16 illustrates a Hoffman reflex resulting from stimulation of a mixed nerve according to another embodiment.
Figure 17:
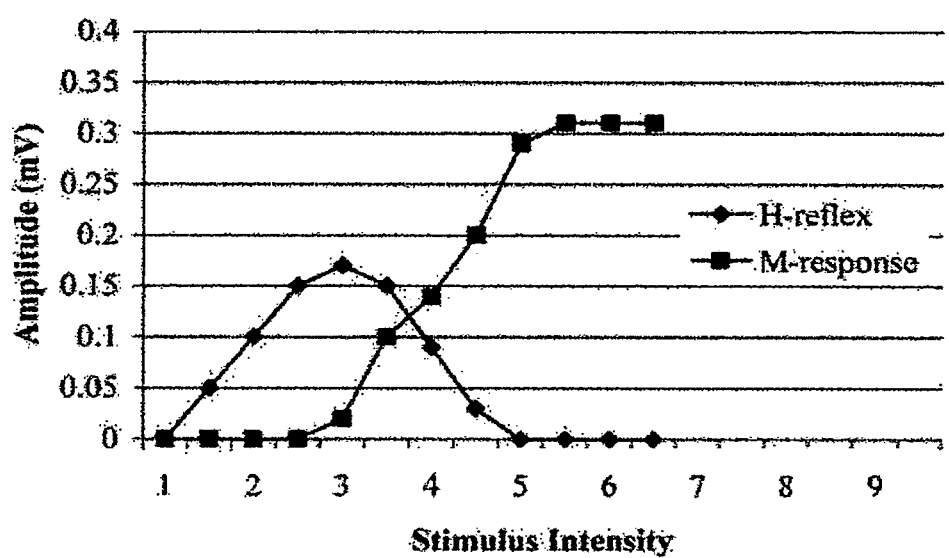
FIG. 17 illustrates M-wave and H-reflex response to increasing levels of stimulus according to another embodiment.

Larger nerve fibers will likely be recruited first, therefore A fibers, specifically Aa and Aβ fibers should be recruited before Aδ and C fibers that have a smaller diameter. As illustrated in FIG. 15, greater Aβ activity will produce a net positive input to the inhibitory interneuron that will result in presynaptic inhibition of the transmission cell and reduce excitation. This will reduce activity of both nociceptive and non-nociceptive neurons. When recruiting afferent Aβ-fibers for pain relief, care must be taken to ensure efferent fibers are not activated which could cause a level of continuous discomfort and annoyance by generating muscle twitches or spasms. To ensure minimal or no muscle activation the method disclosed tracks the amplitude of the H-reflex and M-wave from the EMG waveform in any muscle innervated by the nerve being treated. The H-reflex or Hoffmann's reflex is a muscle reaction to stimuli of Ia muscle afferent fibers that convey signals from muscle spindles to the spinal cord that result in efferent responses seen in the muscle. The tibial and median nerves are commonly used for analysis of the H-reflex. The H-reflex lags the M-wave as illustrated in FIG. 16 and has a constant latency regardless of stimulation amplitude as it activates the same motor neuron pool. Therefore, the H-reflex can be readily identified based on this latency relative to stimulation pulses. As the Ia afferent fibers are larger than motor fibers a response is more easily elicited, and an M-wave should not be induced at levels slightly above the Ia afferent threshold. As previously mentioned, the H-reflex will increase strength with increasing stimuli, but an M-wave will not be induced until just before the H-reflex attains maximum amplitude as illustrated in the recruitment curves of FIG. 17.

Figure 18:
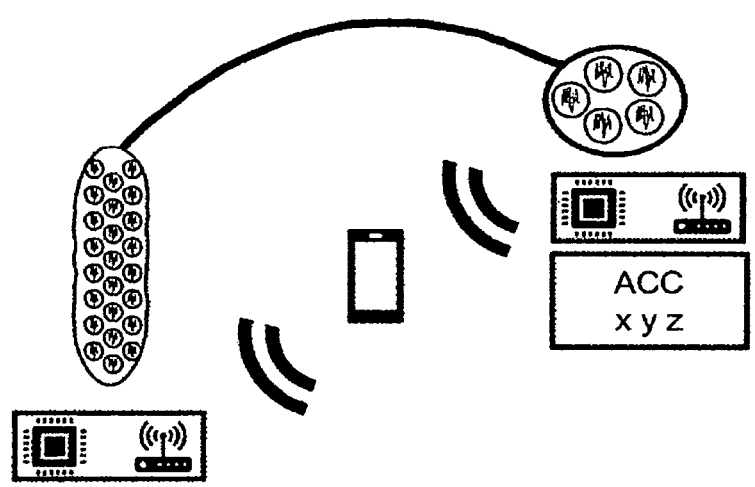
FIG. 18 illustrates an intelligent personalized closed loop neuromodulation system to treat pain according to another embodiment.

A system for providing this functionality is illustrated in FIG. 18, and is based on the same functionality to some extent as described in FIGS. 1 and 3. The system consists of 2 patches, 1 patch with dedicated sensing electrodes and another with dedicated stimulation electrodes. An accelerometer is in the sensing patch to measure motion, and the patches can be hard wired or communicate wirelessly.

Figure 19:
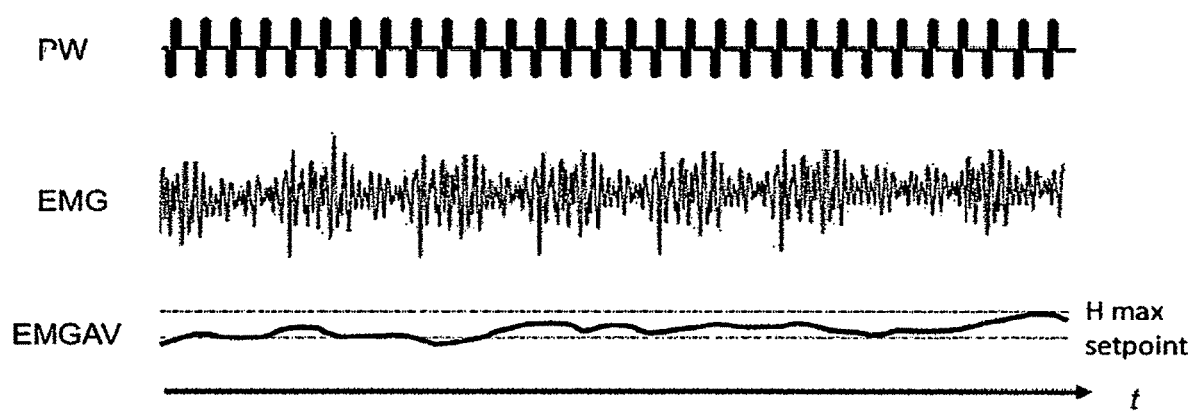
FIG. 19 illustrates a stimulation waveform with resultant EMG and averaged EMG signals according to another embodiment.
Figure 20:
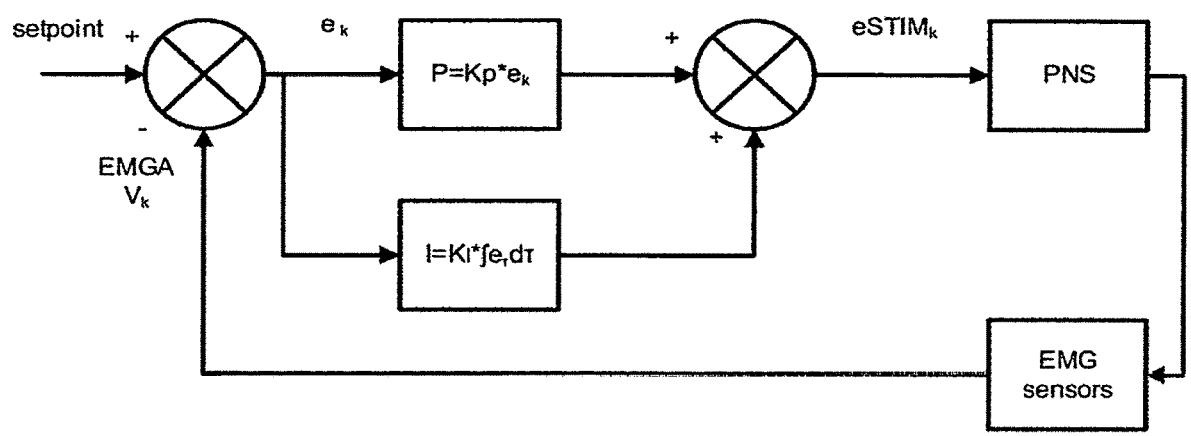
FIG. 20 illustrates a PI closed loop controller to maintain optimal stimulation according to another embodiment.
Figure 21:
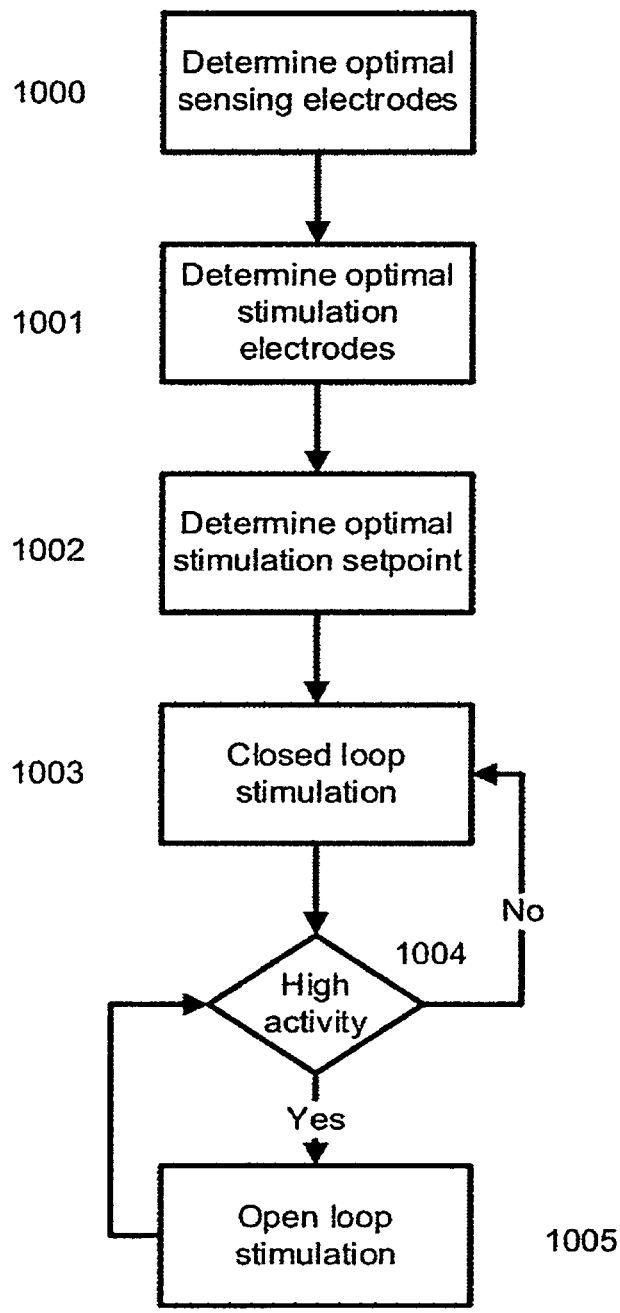
FIG. 21 illustrates a flowchart illustrating stimulation control for pain with activity measurement according to another embodiment.

To ensure no muscle spasms during therapy it is desirable to titrate below the threshold of motor activation and provide movement free paresthesia to mask pain signals. Pain doctors will typically adjust the constant stimulation to a certain level for this purpose. The embodiment disclosed uses the H-reflex when available to provide closed loop control feedback. The maximum amplitude of the H-reflex is determined by pinging with pulses the optimal stimulation electrodes previously determined. The amplitude of the excitation pulses is increased incrementally until the max H-reflex amplitude is reached as measured at the optimally deduced sensing electrodes. The process variable in this closed loop system is EMGAV, which is the average of the EMG signal or its envelope, and the setpoint is fixed to just below the maximum H-reflex amplitude as illustrated in FIG. 19. A PI control system diagrammatically illustrates this process in FIG. 20, although a P, I, PI, PID, MPC or on/off controller could perform this function. In FIG. 20 the peripheral nervous system (PNS) is stimulated with feedback from the innervated muscles to ensure stimuli is kept below the motor activation threshold. In an alternative embodiment when the H-reflex signal is not available, which could be the case for certain nerves and muscle groups, the M-wave is monitored where the setpoint is fixed with minimal amplitude to ensure no activation. The setpoint in this case is determined in similar fashion by pinging electrodes with increasing amplitude until the M-wave appears. An accelerometer residing in the sensing patch illustrated in FIG. 18 placed over the muscle can be used to a) ensure no activity when determining the optimal setpoint 1002, and b) then determining what amplitude triggers movement, and c) ensuring no activity when in closed loop control mode 1003. This process is illustrated in the flowchart of FIG. 21, where the maximum level of stimulation is determined to provide stimuli below the motor activation threshold. During periods of muscle activation, the system returns to open loop mode with safe settings.

In an alternative embodiment the described system can be used for the treatment of overactive bladder (OAB) by stimulating the posterior-tibial nerve. An example if this therapy using the patch described in FIG. 18 is implemented to achieve detrusor inhibition through stimulation of afferent somatic sacral nerve fibers that are accessible through the tibial nerve. The exact mechanism of action in treating urinary disfunction through tibial nerve stimulation is unclear but believed that through modulation of afferent and efferent fibers the sacral plexus can regulate bladder performance. Currently percutaneous tibial nerve stimulation (PTNS) involves the insertion of a catheter into the medical malleolus with patient response to stimulation confirmed by an involuntary toe flexion or extension of the foot. Toe flexion results from stimulation of the S3 nerve root responsible for bladder innervation. The stimulation patch previously described in the treatment of pain would be placed over the tibial nerve region above the ankle. The sensing patch can be placed over a number of muscles responsible for toe flexion including: abductor hallucis, flexor hallucis brevis, flexor digitorum brevis, quadratus plantae, and abductor digiti minimi muscles in the foot and the flexor digitorum longus and flexor hallucis longus muscles in the shank. To treat OAB at home, stimulation therapy would be performed at home for 30 minutes several times a week in a similar fashion as PTNS in the hospital, using the system and methods described herein.

Please note any measurements, materials, drawings provided are meant to offer illustrative examples of the embodiments described herein and are not meant to expressly limit the embodiments to what is literally shown and/or recited. Although the embodiments were primarily presented for use in the treatment of OSA, the sensing and stimulation can be used to treat a wide variety of ailments.

Although the invention has been described in terms of particular embodiments and applications, one of ordinary skill in the art, in light of this teaching, can generate additional embodiments and modifications without departing from the spirit of the or exceeding the scope of the claimed invention. Accordingly, it is to be understood that the drawings and descriptions herein are proffered by way of example to facilitate comprehension of the invention and should not be construed to limit the scope thereof.

What is claimed is:

1. A system for treating obstructive apnea, the system comprising:
 an array of multiple electrodes;
 a memory that can store computer executable instructions; and a processor that is configured to facilitate execution of the executable instructions stored in the memory, wherein the instructions cause the processor to:
 receive electromyogram (EMG) signals from the array of multiple electrodes-disposed upon a submental region of an individual; filter the EMG signals to generate a signal envelope; measure genioglossus muscle activity from the signal envelope to determine optimal sensing electrodes; pulse each optimal sensing electrode and measure a response on the optimal sensing electrodes to determine optimal stimulation electrodes; determine inspiratory and expiratory respiratory phases from the signal envelope; deliver a stimulation to hypoglossal nerve via the optimal stimulation electrodes at a beginning of the inspiratory respiratory phases, and confirm from the optimal sensing electrodes that the stimulation is effective in moving the genioglossus muscle.

2. The system of claim 1, wherein the determining the optimal sensing electrodes further comprises performing maneuvers to activate the genioglossus muscle and locate electrodes with best response.

3. The system of claim 1, wherein the instructions further provide a continual closed loop feedback from EMG waveforms from the optimal sensing electrodes to confirm that the optimal stimulation electrodes are stimulating the genioglossus muscle.

4. The system of claim 3, wherein optimal stimulation electrodes can be updated to a new pair of electrodes.

5. The system of claim 3, wherein the optimal sensing electrodes can be updated to a new pair of electrodes.

6. The system of claim 3, wherein the closed loop feedback is exited to a safe setting when predefined thresholds are exceeded.

7. The system of claim 1, wherein the stimulation has an amplitude and frequency and the frequency is adjusted based on perceived sensation by the individual.

8. The system of claim 1, wherein the instructions further comprise measuring a M-wave and/or H-reflex response on the optimal sensing electrodes and adjusting the stimulation based on the M-wave and/or H-reflex response.

9. The system of claim 1, wherein the beginning of the inspiratory respiratory phases is predicted based on a previous cycle time and an average respiratory rate.

10. The system of claim 1 wherein sleep is detected by measuring the variation in respiratory frequency and tidal volume.

11. The system of claim 1 wherein sleep apnea events are predicted based on changes of the EMG signals during inspiration.

12. A method of treating obstructive apnea, the method comprising:
 providing an array of multiple electrodes;
 receiving electromyogram (EMG) signals from the array of multiple electrodes disposed upon a submental region of an individual;

filtering the EMG signals to generate a signal envelope;

measuring genioglossus muscle activity from the signal envelope to determine optimal sensing electrodes;

pulsing each optimal sensing electrode and measuring a response on the optimal sensing electrodes to determine optimal stimulation electrodes;

determining inspiratory and expiratory respiratory phases from the signal envelope;

delivering a stimulation to hypoglossal nerve via the optimal stimulation electrodes at a beginning of the inspiratory respiratory phases; and confirming from the optimal sensing electrodes that the stimulation is effective in moving the genioglossus muscle.

13. The method of claim 12, wherein the step of determining the optimal sensing electrodes further comprises performing maneuvers to activate the genioglossus muscle and locate electrodes with best response.

14. The method of claim 12, further comprises providing a continual closed loop feedback from EMG waveforms from the optimal sensing electrodes to confirm that the optimal stimulation electrodes are stimulating the genioglossus muscle.

15. The method of claim 14, further comprises updating the optimal stimulation electrodes to a new pair of electrodes.

16. The method of claim 14, further comprises updating the optimal sensing electrodes to a new pair of electrodes.

17. The method of claim 14, further comprises exiting the closed loop feedback to a safe setting when predefined thresholds are exceeded.

18. The method of claim 12, wherein the stimulation has an amplitude and frequency and the method further comprises adjusting the frequency based on perceived sensation by the individual.

19. The method of claim 12 further comprises measuring a M-wave and/or H-reflex response on the optimal sensing electrodes and adjusting the stimulation based on the M-wave and/or H-reflex response.

20. The method of claim 12, wherein the beginning of the inspiratory respiratory phases is predicted based on a previous cycle time and an average respiratory rate.

21. The method of claim 12, further comprises detecting sleep by measuring the variation in respiratory frequency and tidal volume.

22. The method of claim 12, further comprises predicting future sleep apnea events based on changes of the EMG signals during inspiration.

* * * * *